US009954845B2

(12) United States Patent
Charette et al.

(10) Patent No.: US 9,954,845 B2
(45) Date of Patent: Apr. 24, 2018

(54) MULTI-USER MULTI-ROUTER NETWORK MANAGEMENT METHOD AND SYSTEM

(71) Applicant: VENTUS NETWORKS LLC, Norwalk, CT (US)

(72) Inventors: Keith Charette, Fairfield, CT (US); Juan Palma, Stratford, CT (US)

(73) Assignee: VENTUS NETWORKS LLC, Norwalk, CT (US)

( * ) Notice: Subject to any disclaimer, the term of this patent is extended or adjusted under 35 U.S.C. 154(b) by 134 days.

(21) Appl. No.: 14/597,659

(22) Filed: Jan. 15, 2015

(65) Prior Publication Data
US 2015/0200933 A1 Jul. 16, 2015

Related U.S. Application Data

(60) Provisional application No. 61/928,026, filed on Jan. 16, 2014.

(51) Int. Cl.
*H04L 29/06* (2006.01)
(52) U.S. Cl.
CPC .............................. *H04L 63/0815* (2013.01)
(58) Field of Classification Search
CPC ... H04L 63/0815; H04L 63/083; H04L 63/08; G06F 21/41; G06F 21/31
USPC .......................................................... 726/8
See application file for complete search history.

(56) References Cited

U.S. PATENT DOCUMENTS

| 5,737,526 | A  | * | 4/1998  | Periasamy | .............. | H04L 45/04    |
|           |    |   |         |           |                | 709/226       |
| 6,594,704 | B1 | * | 7/2003  | Birenback | ........... | H04L 12/4641  |
|           |    |   |         |           |                | 709/238       |
| 6,771,661 | B1 | * | 8/2004  | Chawla    | .................. | H04L 47/20    |
|           |    |   |         |           |                | 370/468       |
| 7,068,624 | B1 | * | 6/2006  | Dantu     | ..................... | H04L 45/50    |
|           |    |   |         |           |                | 370/331       |
| 8,918,523 | B2 | * | 12/2014 | Nag       | .................. | H04L 29/06027 |
|           |    |   |         |           |                | 709/223       |

(Continued)

OTHER PUBLICATIONS

PCT/US2015/011723 International Search Report and Written Opinion dated Jun. 25, 2015.

*Primary Examiner* — Farid Homayounmehr
*Assistant Examiner* — Sanchit K Sarker
(74) *Attorney, Agent, or Firm* — Grogan, Tuccillo & Vanderleeden, LLP

(57) ABSTRACT

A network management method and system for managing multiple routers under a single user log-in. The network management system implements the method, which includes authenticating a user log-in to the system, displaying a listing of routers accessible from the system by the user, and receiving a user selection of a router from the listing of routers. The method further includes displaying a listing of commands implementable by the selected router, receiving a user selection of a command for the selected router, and implementing the selected command on the selected router, without requiring the user log-in to the selected router. In particular, the selected command is implemented using router credentials retrieved from a database of the network management system. Additionally, the system implements aggregation of data allowances for user devices into a data pool, against which device data usage is allocated.

22 Claims, 9 Drawing Sheets

(56) References Cited

U.S. PATENT DOCUMENTS

| | | | |
|---|---|---|---|
| 2003/0041238 A1* | 2/2003 | French | H04L 29/06 713/153 |
| 2003/0069848 A1* | 4/2003 | Larson | H04L 41/22 705/50 |
| 2004/0179667 A1* | 9/2004 | Belcea | H04M 3/2263 379/207.12 |
| 2006/0209856 A1* | 9/2006 | Tojo | H04L 29/06027 370/401 |
| 2008/0034207 A1* | 2/2008 | Cam-Winget | H04L 63/205 713/163 |
| 2009/0249439 A1* | 10/2009 | Olden | H04L 63/0815 726/1 |
| 2009/0249468 A1* | 10/2009 | Charzinski | H04L 63/0218 726/13 |
| 2010/0199329 A1* | 8/2010 | Walker | H04L 41/0803 726/4 |
| 2012/0320789 A1* | 12/2012 | Wu | H04L 12/2809 370/254 |
| 2012/0329484 A1* | 12/2012 | Rothschild | G01S 5/0242 455/456.5 |
| 2015/0200933 A1* | 7/2015 | Charette | H04L 63/0815 726/8 |

\* cited by examiner

| Nav | Diagnostic | Asset Management | QTAs | Bugs | User ID |

REPORT FORM

Define a New Schedule - Hours of Operation

| Monday | Tuesday | Wednesday | Thursday | Friday | Saturday | Sunday |
| --- | --- | --- | --- | --- | --- | --- |
| 9:00 AM | 9:00 AM | 9:00 AM | 9:00 AM | 9:00 AM | 9:00 AM | 9:00 AM |
| 8:00 PM | 8:00 PM | 8:00 PM | 8:00 PM | 8:00 PM | 8:00 PM | 8:00 PM |

MULTI-USER MULTI-ROUTER NETWORK MANAGEMENT METHOD AND SYSTEM

CROSS REFERENCE TO RELATED APPLICATIONS

The present application is a non-provisional of the application titled "Multi-User Multi-Router Network Management Method and System," Ser. No. 61/928,026 filed Jan. 16, 2014 (hereby incorporated by reference), and also hereby incorporates by reference the entire disclosure of the co-pending application titled "Router," Ser. No. 13/737,501 filed Jan. 9, 2013.

FIELD OF THE INVENTION

The present invention relates to computer networks. Particular embodiments of the invention relate to command and control of computer network routers.

BACKGROUND OF THE INVENTION

Computers and similar devices can be connected to share and exchange information via computer networks. A common type of computer network is a local area network ("LAN") which will typically employ a data communication protocol (LAN standard), such as Ethernet, FDDI or token ring, that defines the functions performed by data link and physical layers of a communications architecture (i.e., a protocol stack). Several LANs may be interconnected by point-to-point links, microwave transceivers, satellite hook-ups, etc. to form a wide area network ("WAN") or "internet" that may span an entire country or continent.

Within a LAN, a switch or router is a computer that includes a plurality of ports that couple the switch to the other computers within the LAN. The switch transfers data among the other computers of the LAN. Transferring data includes receiving data at a source port from one computer and transferring that data to at least one destination port for receipt by another computer. For example, U.S. Pat. Nos. 5,737,526, 7,068,624, and 7,787,340 discuss various aspects of routers and networks.

As mentioned, LANs are connected together via WANs, of which the Internet is the largest and best known example. The Internet is a global system of interconnected computer networks that use the standard Internet protocol suite (often called TCP/IP, although not all applications use TCP) to serve billions of users worldwide. It is a network of networks that consists of millions of private, public, academic, business, and government networks, of local to global scope, that are linked by a broad array of electronic, wireless and optical networking technologies. The Internet carries an extensive range of information resources and services, such as the inter-linked hypertext documents of the World Wide Web (WWW) and the infrastructure to support e-mail.

LANs connect to the Internet via "gateways." A gateway is a computer that is connected between a LAN switch computer and a gateway or switch of a different LAN. Gateways switch data between LANs and separate intra-LAN traffic from Internet traffic. Thus, the Internet consists of communications links between gateways. In some cases, a local device may act both as a computer terminal (for user interface) and as a router and/or gateway.

A router may be connected in communication with the individual computers or devices either by wires (e.g., Ethernet) or wirelessly (e.g., WiFi or similar proprietary radio communication; infrared communication; ultrasound). Similarly, a gateway may be connected with the Internet either by wire/cable (e.g., telephone; DSL; coaxial or optical fiber) or wirelessly (e.g., cellular broadband).

Like any computer, routers are not perfect in operation. Occasionally it is necessary to access a router in order to adjust various settings, to upgrade its software, or to reboot it when it stops working correctly. This sort of access or administration can be accomplished locally—by physically going to the router and plugging in a human interface device, such as a keyboard; or it can be accomplished remotely—by logging into the router via its own Internet connection.

Typically, remote access is accomplished by a process of establishing a TCP/IP connection, then sending log-in information, then sending commands to configure or reboot the router. Where multiple routers are to be adjusted, each is logged-in separately, via a unique TCP/IP session. The process of administering multiple routers therefore is sequential and time-consuming.

SUMMARY OF THE INVENTION

According to embodiments of the invention, a system is provided for remotely administering a plurality of routers using a single log-in and interface. The system includes a computer configured to provide an administrator interface in response to an authorized user log-in, the same or another computer configured to maintain a database of routers and authorized users, and the same or another computer configured to access a selected router in response to an authorized user instruction, based on information retrieved from the database.

According to aspects of the invention, a method is provided for remotely administering a plurality of routers using a single log-in and interface. The method includes receiving an authorized user log-in, displaying an administrator interface in response to the authorized user log-in, and retrieving from a database a listing of routers accessible by the authorized user. The method also includes receiving a selection of a router to be accessed, comparing the selected router to the listing of accessible routers, and accessing the router using credentials retrieved from the database.

According to other aspects of the invention, a method is provided for managing multiple routers under a single user log-in. The method includes authenticating a user log-in to a network management system, displaying a listing of routers accessible from the network management system by the user, and receiving a user selection of a router from the listing of routers. The method further includes displaying a listing of commands implementable by the selected router, receiving a user selection of a command for the selected router, and implementing the selected command on the selected router, without requiring the user log-in to the selected router. In particular, the selected command is implemented using router credentials retrieved from a database of the network management system.

According to other aspects of the invention, data allowances provided for multiple user devices are aggregated into a data pool, against which device data usage is allocated.

These and other objects, features and advantages of the present invention will become apparent in light of the detailed description of the best mode embodiment thereof, as illustrated in the accompanying drawings.

BRIEF DESCRIPTION OF THE DRAWINGS

FIGS. 3 through 8 are schematic views of an interface provided according to the method shown in FIG. 2.

DETAILED DESCRIPTION OF THE PREFERRED EMBODIMENT

Figure 1:
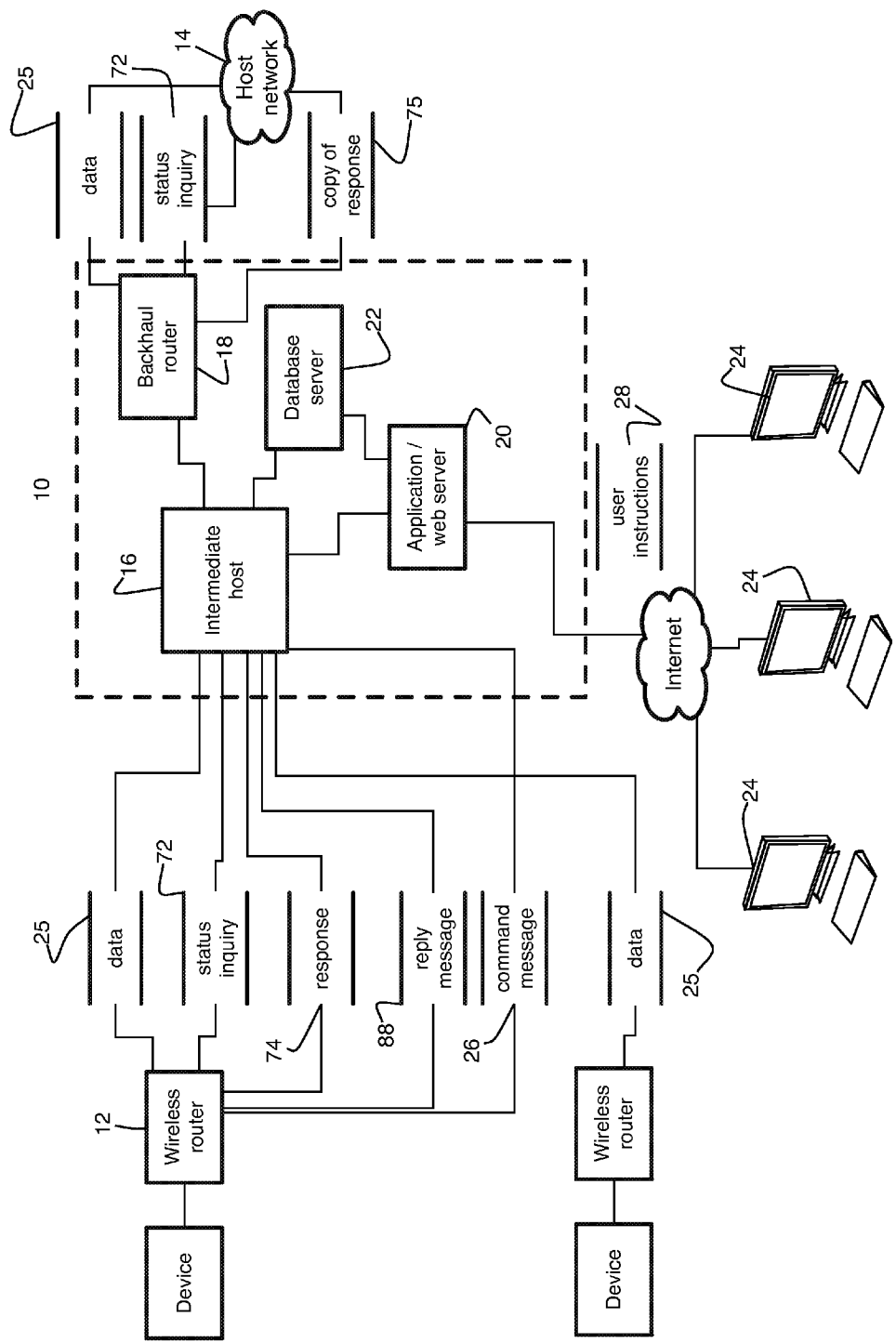
FIG. 1 is a schematic view of a multi-router network management system, according to an embodiment of the present invention.

Embodiments of the invention provide a multi-router network management system 10, as shown in FIG. 1, that connects a plurality of user devices 11 via routers 12 with a host system 14. The network management system is configured for remotely accessing any of the plurality of routers 12. The network management system 10 includes one or more VPN concentrators 16, which are connected in communication with the routers 12. The network management system also includes one or more back haul routers 18, which are connected in communication with the host system 14. The VPN concentrators 16 communicate with the back haul routers 18 to effectuate data transfer between the routers 12 and the host system 14. The network management system 10 also includes at least one interface application server ("app server") 20, which is connected in communication with the VPN concentrator(s) 16 and with a database 22, and which also is configured for communication with one or more external user terminals 24.

Each of the VPN concentrator(s) 16 is configured for receiving data 25 from the routers 12 with which that VPN concentrator is connected, and passing that data through one of the back haul routers 18 to the host system 14. Such data may include, for example, customer financial data; web browsing data; device or system status data; routine status checks, such as ICMP responses 74 (further discussed below); etc. Each of the VPN concentrator(s) 16 also is configured for sending one or more command message(s) 26 from the app server 20 to one or more of the routers 12, and for receiving back reply messages 88 as further discussed below with reference to FIG. 2.

The app server 20 is configured to generate command messages 26, in response to user instructions 28 that are received from one of the external user terminals 24, as further discussed below.

Figure 2:
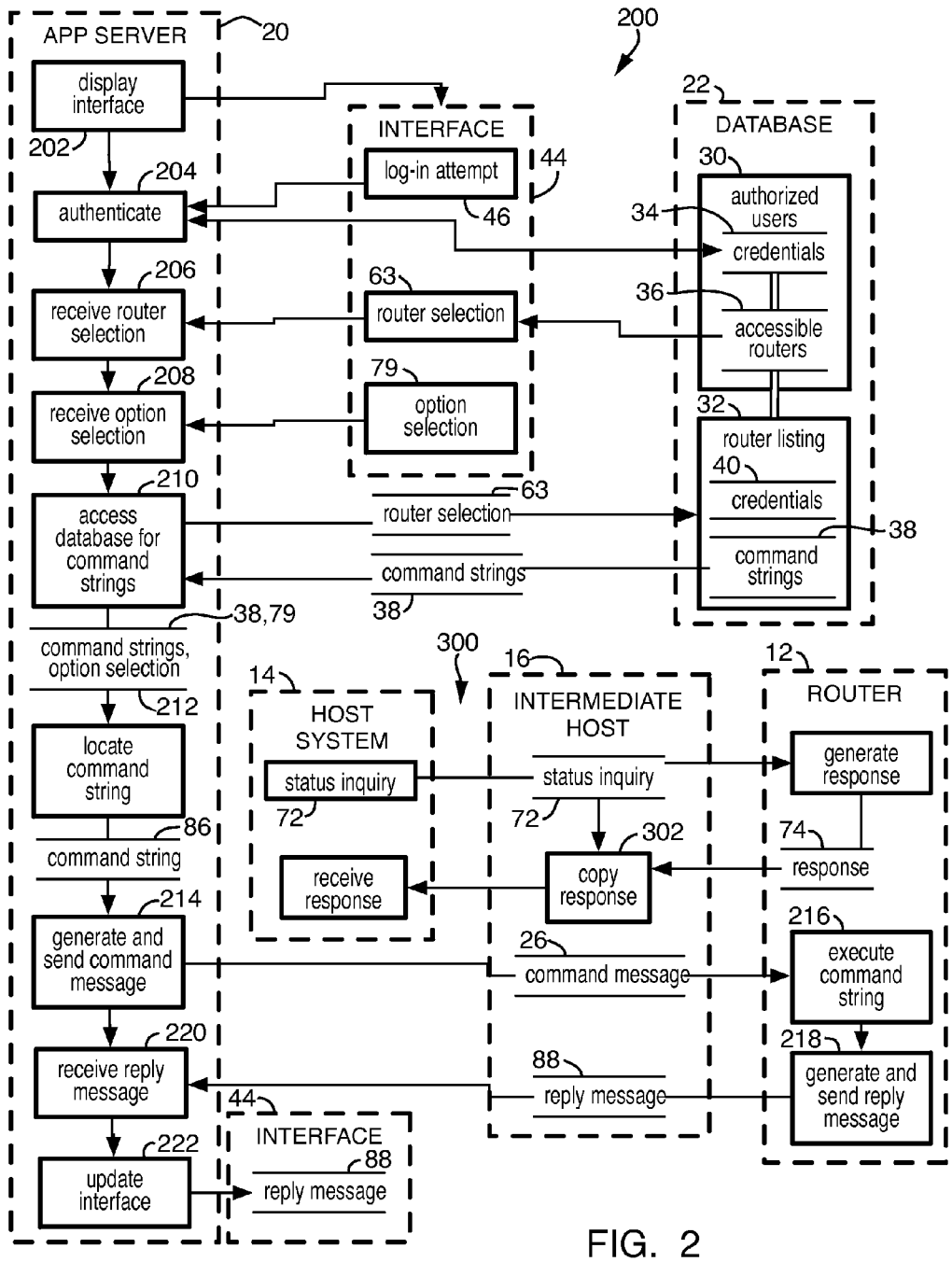
FIG. 2 is a schematic view of a method of operation of the network management system shown in FIG. 1, according to an aspect of the present invention.

In embodiments of the invention, as shown in FIG. 2, the database 22 is configured to maintain a first list 30 of authorized users and a second list 32 of routers 12. The first list 30 includes for each authorized user that user's log-in credentials 34 and a sub-list 36 of user-accessible routers (routers which that user is authorized to access). The second list 32 includes for each router 12 a sub-list of command strings 38 that can be executed or implemented by that router in response to a corresponding set of user instructions 28 ("implementable commands"). Each command string is associated with a corresponding user instruction. The second list 32 also includes, for each router 12, that router's system user log-in credentials 40. Further, the second list 32 includes for each router 12 a status history 41, which may include listings of previous commands, past error codes, acknowledgements or replies to commands, physical parameters, and router settings.

In aspects of the invention, the interface application server ("app server") 20 executes a method 200, shown in FIG. 2, e.g., a method for providing an authorized user single log-in access to a plurality of accessible routers 12. Under the method 200, at step 202 the app server 20 displays at one of the user terminals 24 an interface 44 for receiving an authorized user log-in attempt 46. At step 204, the app server 20 authenticates the log-in attempt 46, then updates the interface 44 to display a "NAV" window 48. In particular, the app server 20 accesses the database 22 for comparing contents of the log-in attempt 46 to the credentials 34 within the list 30 of authorized users.

Figure 3:
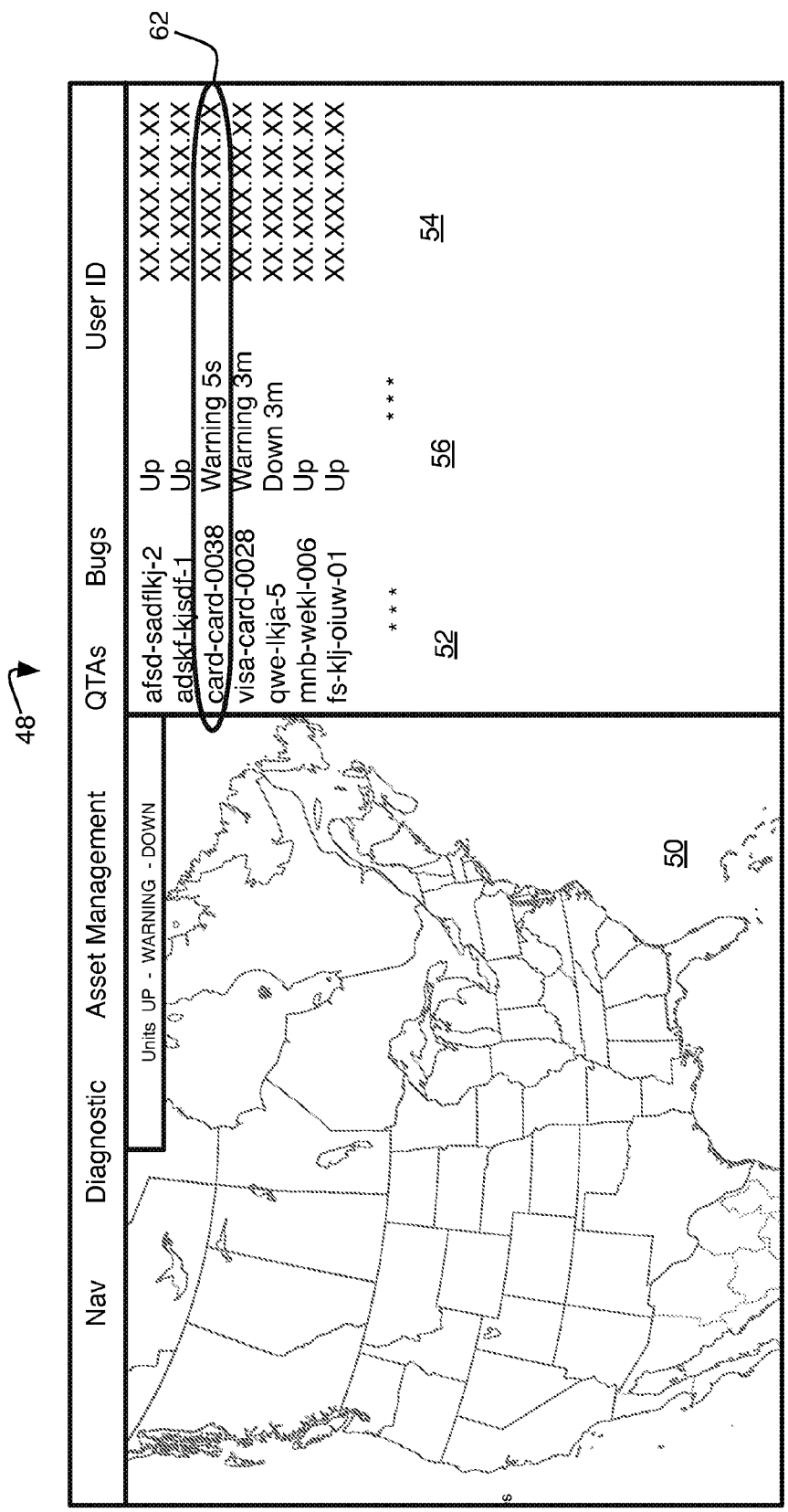

As shown in FIG. 3, the NAV window 48 displays an interactive map 50 of routers 12 corresponding to the listing 36 of routers accessible by the authorized user. Adjacent the map 50, the NAV window 48 displays the router listing 36, which includes each router's name 52, IP address 54, and status 56. In certain embodiments, the status 56 may include one or more error messages. Within the router listing 36 or on the interactive map 50, a user may select a router 62 for further actions using the other tabs. Referring to FIG. 2, at step 206 the app server 20 receives as an instruction 28 a user selection 63 of one of the routers 12, and in response to the user selection 63, the app server 20 sets the selected router as the currently selected router 62.

Figure 4:
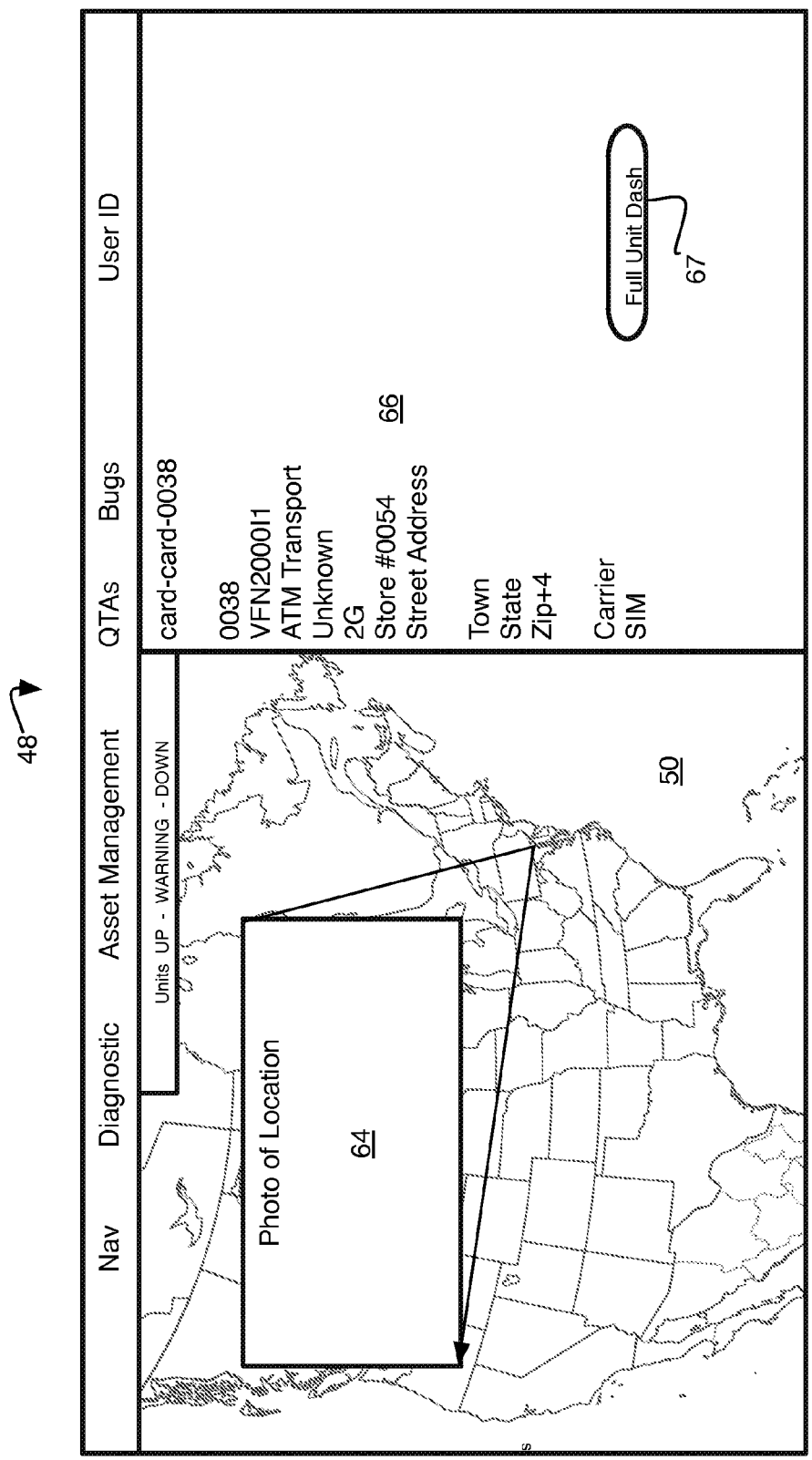

FIG. 4 shows what happens in the NAV window 48 when a router 62 is selected: the map 50 zooms in to the selected router location. Additionally, a pop-up window 64 displays a "street view" location of the router 62. Also, the listing 36 is replaced by a router detail or drill-down box 66. The drill-down box 66 indicates the operating status of the selected router 62, and also offers a control 67 for accessing a "FULL UNIT DASH" window, further discussed below with reference to FIG. 5.

Figure 5:
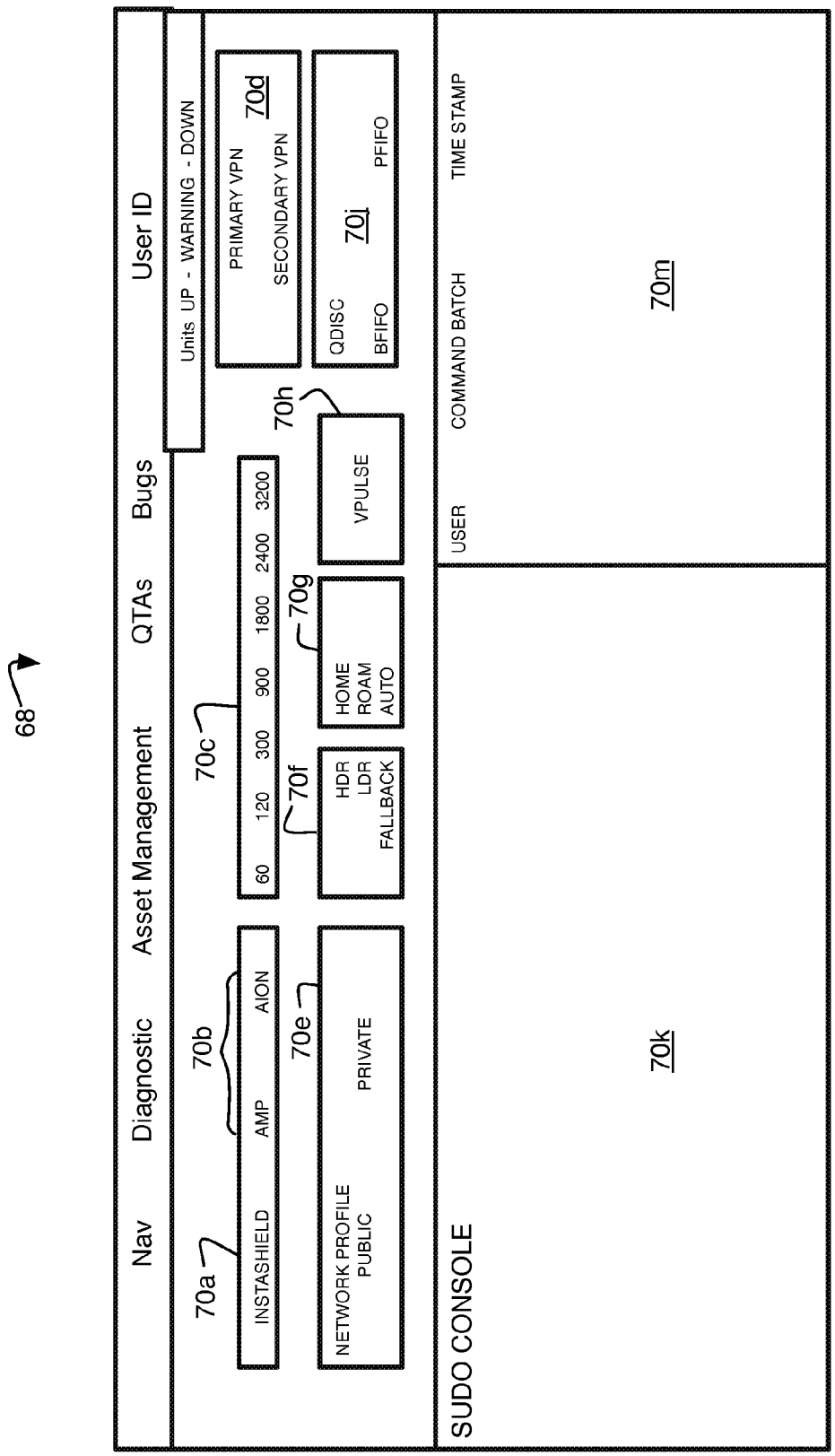

Referring to FIG. 5, the FULL UNIT DASH window 68 displays a plurality of user selectable configuration options 70. The displayed configuration options 70 correspond to the currently selected router 62. Each configuration option 70 may be presented as a checkbox, a radio button, a press button, a slider, a dial, or any other conventional user-selectable emblem. In case no router is selected, the configuration options are greyed out or not displayed or are displayed but cannot be selected. In case some of the displayed configuration options are not functional for use with a selected router, the non-functional configuration options may be greyed out or not displayed or may be displayed but non-selectable. Alternatively, even if selected, the non-functional configuration options will not result in generation of a command message as further discussed below.

Exemplary configuration options 70 include advanced firewall management ("INSTASHIELD") 70a; keep alive spoofing ("AMP", "AION") 70b; connection test interval 70c; primary VPN channel 70d; network profile 70e; data rate 70f; roaming permission 70g; connection maintenance 70h; QDISC (queue discipline) manager 70j. Other configuration options can be accomplished as "SUDO COMMANDS" 70k. As non-limiting examples, SUDO COMMANDS can include upgrading router software over-the-air (OTA), or checking router port connections status. The FULL UNIT DASH window 68 also includes a history 70m of previously selected configuration options 70.

The INSTASHIELD option 70a can be selected to enable monitoring of a conventional firewall error log for detecting certain conditions about the type of traffic coming into the router. When adverse conditions are detected (e.g., UDP fragment attack, SYN flood, spam, etc.), INSTASHIELD commands the router to switch network profiles 70e, from Public to Private or vice versa, in order to avoid unnecessary, unwarranted, unsolicited network usage. Here, "public" refers to a publicly accessible carrier network, e.g., a conventional cellular broadband system or fixed line POTS (plain old telephone system). By contrast, "private" describes a network accessible only by select equipment, using special access codes. By switching public-to-private or private-to-public, INSTASHIELD can curtail unwanted traffic because traffic on one network may not have access to the other network. Additionally, INSTASHIELD can establish bandwidth collaring on the router 62, thereby protecting the network management system 10 from excess traffic through the associated VPN concentrator 18. "Bandwidth collaring" means adjusting queue discipline, further discussed below, so as to limit a router's effective data rate to less than the router's maximum designed data rate. This measure may cause some data to be lost.

Referring back to FIGS. 1 and 2, in an aspect of the invention, the keep alive spoofing option 70b ("AION") can be selected to configure the network management system 10 to perform a method 300 of receiving and responding to status inquiries 72 from the host system 14, as well as passing these inquiries through to the selected router 62. The selected router 62 eventually will respond to each status inquiry 72 by generating a unique response 74. However, at step 302, the network management system 10 preemptively responds to each status inquiry 72 by forwarding a copy 75 of a prior response 74 most recently received from the router 12. Thus, the network management system 10 can provide to the host system 14 an apparent latency less than 90 ms, although the actual round-trip from host system to router 12 and back may exceed 250 ms. In case the host system is configured to use time-stamped status inquiries, then the network management system 10 can be configured to modify the time stamp of the most recently received response 74, so as to match the most recently received status inquiry 72.

Referring again to FIG. 5, the connection test interval 70c can be adjusted to accomplish a test once every 60 seconds, 120 seconds, etc. out to once every 3200 seconds. In case a connection test is failed, the network management system 10 can automatically take any of the following actions: changing the primary VPN channel 70d; changing the network profile 70e; rebooting the selected router 62; restarting the primary VPN channel 70d.

The QDISC manager 70j permits re-configuration of "queue discipline," which is how the router 62 handles an "upgoing" stream of information sent from a user connected device 11, through the router 12, through the network management system 10, to the host system 14. This stream of information is processed through a queue or "bucket" which can manage or cache an overflow of information which cannot immediately be processed by the router 62, in cases where information is being sent too quickly. The router 62 stores/caches the overflow, and the size of the overflow bucket (the queue discipline) is defined by a setting within the QDISC manager 70j. The QDISC manager 70j also configures whether the router 62 will process the upgoing information by bytes (Byte First In, First Out or BFIFO for short) or by packets (Packet First In, First Out or PFIFO for short). What is chosen depends on the traffic being sent, where in some cases there are a small number of packets that each contain many bytes (BFIFO) or in other cases there are a large number of packets that each contain few bytes (PFIFO). By default, PFIFO is how packets are processed by each of the routers 12. Additionally, the QDISC manager 70j can configure the router firewall to adjust the allowable packet size, thereby controlling rate of data flow.

Figure 6:
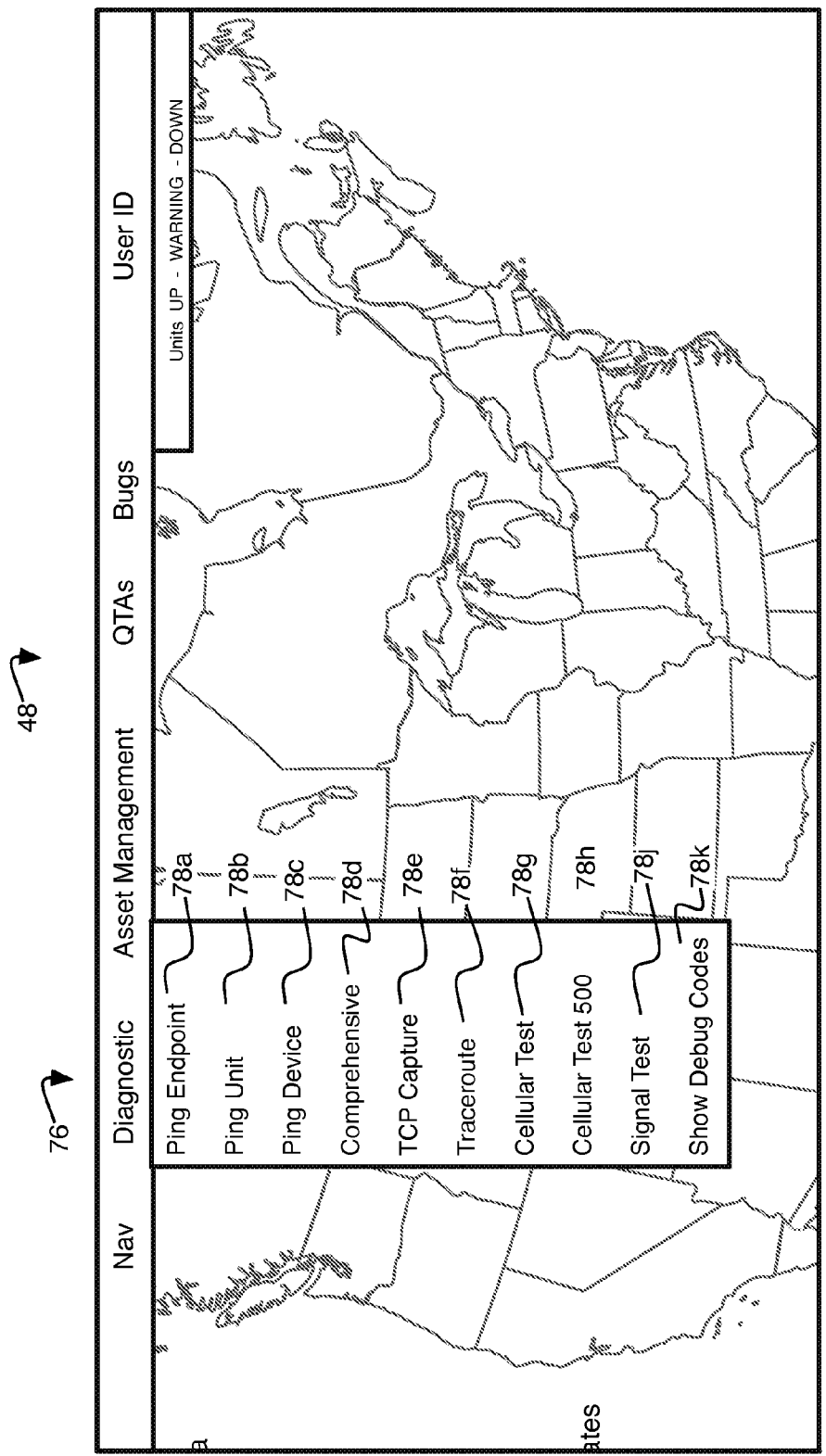

As shown in FIG. 6, the interface 44 also includes a "DIAGNOSTICS" menu 76, accessible from the NAV window or from any other window, which displays a plurality of diagnostic options 78 that can be run on the selected router 62. Each diagnostic option 78 is presented with a text description and accompanying icon. In case a router is selected, clicking on one of the diagnostic options 78 will result in production of a command message 26 as further discussed below. In case no router is selected, clicking on one of the diagnostic options 78 will have no effect.

Exemplary diagnostic options 78 include an endpoint ping 78a; a unit ping 78b; an attached device ping 78c; a comprehensive diagnostic 78d; a TCP capture 78e; a trace route 78f; cellular tests 78g, 78h; a signal test 78j; and a router debug code listing 78k.

For example, the comprehensive diagnostic option 78d provokes the app server 20 to retrieve from the database 22 all relevant information regarding the selected router 62, including, what user equipment is connected to the router. The comprehensive diagnostic 78d then involves sending diagnostic queries not only to the selected router 62, but also to the connected user equipment, as well as to the associated VPN concentrator 16, back haul router 18, and host system 14. Thus, the comprehensive diagnostic 78d provides an end-to-end status of the communications link from the connected user equipment through the router 12 and the network management system 10 to the host system 14.

Collectively, the configuration options 70 and the diagnostic options 78 may be referred to as "commands."

Figure 7:
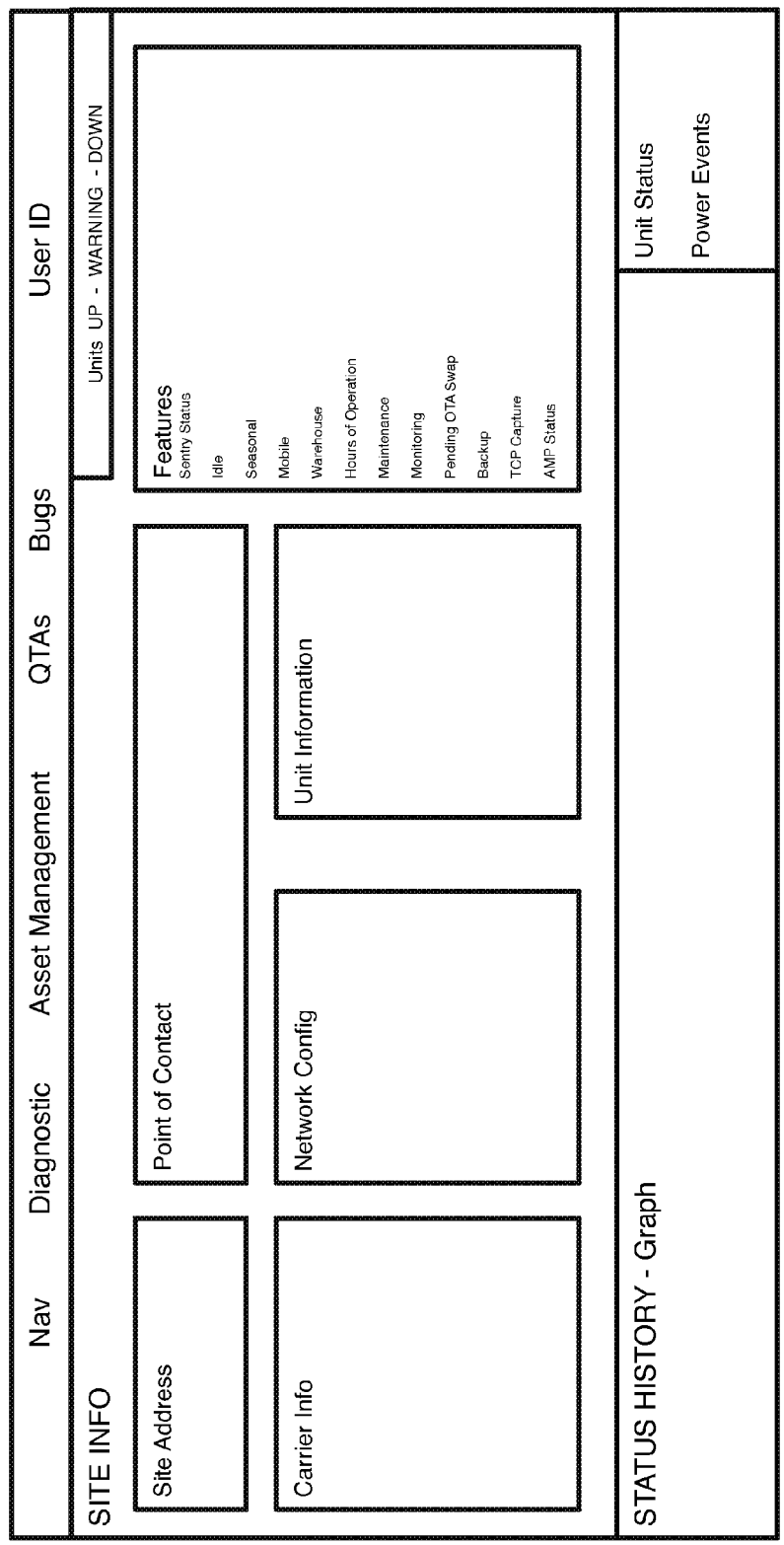

As shown in FIG. 7, a "SITE INFO" window 80, which displays a range of status and configuration information related to the selected router 62, can be accessed from the FULL UNIT DASH. The SITE INFO window displays information including a site address, administrator contact data, carrier info, network configuration data, unit information, configuration settings, and a status history. The SITE INFO window also can be manipulated to display a status breakdown, signal quality history, temperature history, or usage history. The status breakdown may include a comprehensive listing of data from the database 22, including past commands, errors, status codes, settings, etc.

Referring to FIG. 8, a SLEEP MODE control window 82 is accessible via the SITE INFO window 80 or via the FULL UNIT DASH window 68. Under the SLEEP MODE control window it is possible to configure hours of operation 70n for the selected router 62, using pulldown menus 84 as shown.

Referring again to FIG. 2, each diagnostic option 78 or configuration option 70 is selectable by the user for setting up a command message 26 to be sent to the currently selected router 62. At step 208 the app server 20 receives from the interface 44 a user selection 79 of a diagnostic option 78 or of a configuration option 70.

At step 210, in response to the user selection of the diagnostic option 78 or configuration option 70, the app server 20 accesses the database 22 and retrieves, from the list 32 of routers 12, a set of command strings 38, as well as user credentials 40, that correspond to the currently selected router 62. At step 212, the app server 20 locates within the set of command strings 38 a particular command string 86 that corresponds to the selected diagnostic option 78 or configuration option 70. At step 214, the app server 20 generates a command message 26 that incorporates the particular command string 86 along with the log-in credentials 40 for the currently selected router 62, and sends the command message 26 to the VPN concentrator 16 that is connected in communication with the currently selected router 62. The VPN concentrator 16 then passes the command message 26 to the currently selected router 62, which at step 216 executes the particular command string 86 under the log-in credentials 40. In response to the command string 86, the router 62 generates a reply message 88, and at step 218 sends the reply message 88 through the VPN concentrator 16 to the app server 20. At step 220, the app server 20 receives the reply message 88 and updates the database 22 to record the then-current status of the selected router 62. At step 222, the app server 20 updates the interface 44 to display the contents of the reply message 88.

As discussed above, any of the diagnostic options 78 or configuration options 70 can be user selected to generate a command message 26 directed to the selected router 62.

As another example, the primary VPN channel 76d may be selected among plural wireline or wireless communication modes or channels. FIG. 7 shows a choice of two channels, however, additional channels may be included. In a cost based automatic channel selection algorithm, the primary VPN channel may be assigned a lower COST_DEV based on user preference, as further discussed in the co-pending application titled "ROUTER."

Notably, the authorized user can accomplish any of the diagnostics options 72 or configuration options 70 without directly logging in to the currently selected router 62, and the authorized user does not need to know any of the command strings 38 associated with the currently selected router 62. Instead, router administration can be accomplished entirely via manipulation of the diagnostics/configuration options 72, 70 within the interface 44. This feature of the invention is decidedly advantageous over typical interfaces, which are known to require re-authentication of a user's credentials for each router the user wishes to administer. By contrast to prior art, the authorized user can remotely administer any of the routers 12 within the user's listing 36, without needing to re-authenticate for any particular router. Thus, an aspect of the invention is that it automates endpoint equipment access and management by providing simple graphical user interface (GUI) commands. In another aspect, the invention also automates equipment diagnostics by providing simple GUI commands. Thus, the invention allows for endpoint connection management and performance monitoring on multiple modes of communication, both fixed line and wireless.

The system and method as described herein, can be configured either as a NOC version (super user with access to all connected routers) or as an end user version (access only to routers on the end user's listing 36). Thus, the invention is scalable and permissionable.

Figure 9:
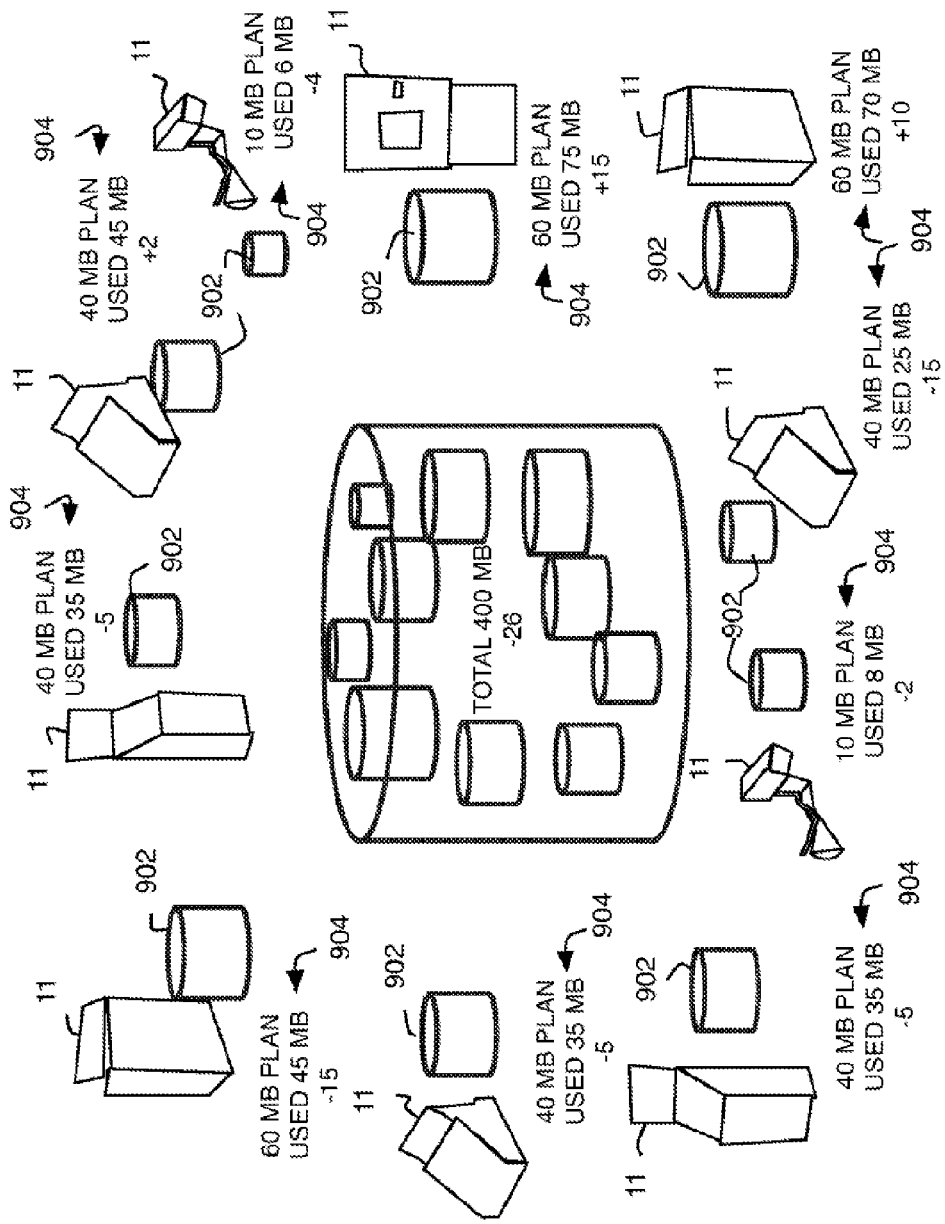
FIG. 9 illustrates a data pooling scheme, according to another aspect of the present invention.

According to another aspect of the present invention, an authorized user may use the network management system 10 to implement pooling of the authorized user's data plans with several communications carriers. FIG. 9 illustrates, in schematic view, how a data pooling method 900 works under the present invention. Each of a plurality of user devices 11 has an associated data allowance 902, and an associated data usage 904. Within the network management system database 22, the data allowances 902 are aggregated into a pool 906 while the data usages 904 are aggregated into a drain 908. The network management system 10 allocates the drain 908 so as to avoid overage charges on any of the data allowances 902. Thus, data pooling simplifies plan management and helps customers manage fluctuating transaction/data traffic demands by removing the requirement for precise monthly usage estimates. The database 22 is configured to monitor the pool and/or individual units, run bandwidth usage reports, set overage alerts to trigger email notifications when pre-determined thresholds approach, and proactively manage plans as needed to avoid overages. Monthly billing is based on the aggregated totals of all devices in the data pool; and all plans are consolidated into a single invoice for simplified plan management.

Although this invention has been shown and described with respect to the detailed embodiments thereof, it will be understood by those skilled in the art that various changes in form and detail thereof may be made without departing from the spirit and the scope of the invention.

What is claimed is:

1. A method of managing multiple routers under a single user log-in, comprising:
   authenticating, via an app server connected in communication with a database and a user terminal, a user log-in to a network management system;
   displaying, via the app server, a listing of routers accessible from the network management system by the user;
   displaying, via the app server, a map that depicts graphical geographic representations of locations corresponding to the listing of routers;
   receiving, at the app server, a user selection of a router from the listing of routers;
   displaying, via the app server, a listing of commands implementable by the selected router;
   receiving, at the app server, a user selection of a command for the selected router; and
   implementing, via the app server, the selected command on the selected router, without requiring the user log-in to the selected router; and
   wherein displaying the listing of commands includes accessing a database listing of accessible routers and implementable commands that include an option to configure the network management system to preemptively respond to inquiries from a host system to the selected router.

2. A method as claimed in claim 1, wherein authenticating a user log-in includes receiving user credentials and comparing the received credentials to a database listing of authorized users.

3. A method as claimed in claim 1, wherein displaying a listing of routers includes accessing a database listing of authorized users and accessible routers.

4. A method as claimed in claim 1, wherein the displayed map is interactive such that receiving a user selection of a router includes receiving a click on the map.

5. A method as claimed in claim 1, further comprising, in response to the user selection of a router, displaying additional information regarding the selected router.

6. A method as claimed in claim 1, wherein the listed commands include an option to configure the selected router for automatic switching of a network profile in response to network traffic matching an adverse condition corresponding to a network attack profile.

7. A method as claimed in claim 1, wherein the listed commands include an option to configure the selected router for automatic bandwidth collaring in response to excess traffic corresponding to a data rate that exceeds a maximum data rate of the selected router.

8. A method as claimed in claim 1, wherein the listed commands include an option to adjust a connection test periodicity of the selected router.

9. A method as claimed in claim 1, wherein the listed commands include an option to configure queue discipline of the selected router.

10. A method as claimed in claim 1, wherein the listed commands include an option to remotely implement a diagnostic routine on the selected router, and on a user device connected to the selected router, without requiring the authorized user log-in to the user device.

11. A method as claimed in claim 1, wherein the listed commands include an option to configure hours of operation of the selected router.

12. A method as claimed in claim 1, wherein implementing the selected command on the selected router includes accessing a database listing of routers accessible by the user, retrieving from the listing of routers the selected router log-in credentials, retrieving from the listing of routers a command string corresponding to the selected command, and sending to the selected router the log-in credentials and the command string.

13. A network management system comprising:
a VPN (Virtual Private Network) concentrator connected in communication between at least one router and a host system;
a database connected in communication with the VPN concentrator, said database storing a listing of authorized users and a listing of routers, said listing of authorized users including for each user log-in credentials and a sub-list of user-accessible routers, said listing of routers including for each router log-in credentials and a sub-list of implementable commands; and
an app server connected in communication between the database and a user terminal, said app server configured to:
display an interface via the user terminal; receive via the interface a user log-in; authenticate the user log-in using the database;
display, in response to the authenticated user log-in, a listing of routers accessible by the user;
display a map that depicts graphical geographic representations of locations corresponding to the listing of routers;
receive a user selection of a router;
receive a user selection of a command to be implemented by the router without requiring the user log-in to the selected router: and
in response to the user selection of the router, retrieve from the database a listing of commands implementable by the selected router, and display via the interface the listing of commands,
wherein the listed commands include an option to configure the network management system to preemptively respond to inquiries from a host system to the selected router.

14. A network management system as claimed in claim 13, wherein the app server is further configured to implement the selected command on the selected router using router log-in credentials retrieved from the database.

15. A network management system as claimed in claim 13, wherein the VPN concentrator is configured to respond to status inquiries received for the router from the host system.

16. A network management system as claimed in claim 13, wherein the listed commands include an option to configure the selected router for automatic switching of a network profile in response to network traffic matching an adverse condition corresponding to a network attack profile.

17. A network management system as claimed in claim 13, wherein the listed commands include an option to configure the selected router for automatic bandwidth collaring in response to excess traffic corresponding to a data rate that exceeds a maximum data rate of the selected router.

18. A network management system as claimed in claim 13, wherein the listed commands include an option to adjust a connection test periodicity of the selected router.

19. A network management system as claimed in claim 13, wherein the listed commands include an option to configure queue discipline of the selected router.

20. A network management system as claimed in claim 13, wherein the listed commands include an option to remotely implement a diagnostic routine on the selected router, and on a user device connected to the selected router, without requiring the authorized user log-in to the user device.

21. A network management system as claimed in claim 13, wherein the listed commands include an option to configure hours of operation of the selected router.

22. A method of managing multiple routers under a single user log-in, comprising:
authenticating via an app server connected in communication between a database and a user terminal a user log-in to a network management system;
displaying, via the app server a listing of routers accessible from the network management system by the user;
displaying, via the app server a map that depicts graphical geographic representations of locations corresponding to listing of routers;
receiving, at the app server a user selection of a router from the listing of routers;
displaying, via the app server a listing of commands implementable by the selected router;
receiving, at the app server a user selection of a command for the selected router;
displaying, via the app server a configuration history of the selected router;
implementing, via the app server the selected command on the selected router, without requiring the user log-in to the selected router; and
preemptively responding to status requests for the selected router via the network management system;
wherein displaying the listing of commands includes accessing a database listing of accessible routers and implementable commands that include an option to configure the network management system to preemptively respond to inquiries from a host system to the selected router.

* * * * *